US011556574B2

(12) United States Patent
Yegorin (10) Patent No.: US 11,556,574 B2
(45) Date of Patent: Jan. 17, 2023

(54) PREPARING DOCUMENTS FOR COREFERENCE ANALYSIS

(71) Applicant: International Business Machines Corporation, Armonk, NY (US)

(72) Inventor: Anton Yegorin, Dublin (IE)

(73) Assignee: International Business Machines Corporation, Armonk, NY (US)

(*) Notice: Subject to any disclaimer, the term of this patent is extended or adjusted under 35 U.S.C. 154(b) by 247 days.

(21) Appl. No.: 17/139,147

(22) Filed: Dec. 31, 2020

(65) Prior Publication Data

US 2022/0207065 A1    Jun. 30, 2022

(51) Int. Cl.
*G06F 16/33* (2019.01)
*G06F 16/332* (2019.01)
*G06F 40/247* (2020.01)

(52) U.S. Cl.
CPC ...... *G06F 16/3329* (2019.01); *G06F 16/3344* (2019.01); *G06F 40/247* (2020.01)

(58) Field of Classification Search
CPC . G06F 16/3329; G06F 16/3344; G06F 40/247
See application file for complete search history.

(56) References Cited

U.S. PATENT DOCUMENTS

| | | | |
|---|---|---|---|
| 6,438,543 B1 | 8/2002 | Kazi | |
| 8,712,758 B2 * | 4/2014 | Crouch | G06F 40/279 704/9 |
| 9,189,473 B2 | 11/2015 | Gallé | |
| 9,633,002 B1 | 4/2017 | Balluru | |
| 2016/0170957 A1 | 6/2016 | Allen | |
| 2019/0012374 A1 | 1/2019 | Petroni | |

OTHER PUBLICATIONS

"Haven't I Met You Before? Cross-Document Coreference Resolution," Rosette Text Analytics, Jun. 4, 2012, 5 pages. <https://www.rosette.com/blog/havent-i-met-you-before-cross-document-coreference-resolution/>.
Rao et al., "Streaming Cross Document Entity Coreference Resolution," Coling 2010, 23rd International Conference on Computational Linguistics, Posters Volume, Aug. 23-27, 2010, 9 pages. <https://www.cs.jhu.edu/~mdredze/publications/streaming_coref_coling.pdf>.
Wick et al., "Large-scale author coreference via hierarchical entity representations," Proceedings of the 30th International Conference on Machine Learning, JMLR: W&CP, vol. 28, May 7, 2013, 8 pages. <https://openreview.net/pdf?id=TTFCKqmXtgaYf>.

* cited by examiner

*Primary Examiner* — Sonia L Gay
(74) *Attorney, Agent, or Firm* — Brian D. Welle (57) ABSTRACT

Unstructured text is identified as larger than a threshold size. Named-entity recognition analysis is executed on the unstructured text. One or more anchor entities of the unstructured text are determined that each occur more than a threshold amount of times within the unstructured text. Two or more instances of the one or more anchor entities that are separated by at least a threshold amount of text of the unstructured text are identified. The unstructured text is partitioned into at least three sections. The unstructured text is partitioned at respective natural language demarcation points associated with each of the two or more instances such that each of the at least three sections is smaller than the threshold size. Separate coreference analyses are performed in parallel on each of the at least three sections.

20 Claims, 3 Drawing Sheets

PREPARING DOCUMENTS FOR COREFERENCE ANALYSIS

BACKGROUND

Computers are increasingly being used for natural language processing (NLP) techniques, such as processing unstructured text into larger structured corpora. This unstructured text may include text for which the only known data is the incoming characters, and metadata such as parts-of-speech of various words, a topic of a sentence, or other syntactical or thematic elements of the unstructured text are unknown. A computer may use NLP techniques to determine some or all of this metadata. Part of this NLP analysis may include a coreference analysis. A coreference analysis may include an analysis to determine when multiple terms refer to the same concept or entity, such as "dad," "father," and "pop."

SUMMARY

Aspects of the present disclosure relate to a method, system, and computer program product relating to preparing a document for coreference analysis. For example, the method includes running named-entity recognition analysis on an unstructured text in response to determining that the unstructured text is larger than a threshold size. The method also includes identifying one or more anchor entities of the unstructured text that each occur more than a threshold total amount of times within the unstructured text. The method also includes identifying two or more instances of the one or more anchor entities that are separated by at least a threshold amount of text of the unstructured text. The method also includes partitioning the unstructured text at respective natural language demarcation points associated with each of the two or more instances. The unstructured text is partitioned into at least three sections such that each of the at least three sections is smaller than the threshold size. The method also includes performing separate coreference analyses in parallel on each of the at least three sections. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to preparing a document for coreference analysis, while more particular aspects of the present disclosure relate to intelligently partitioning a large document into manageable chunks for parallel coreference analysis that may be cleanly merged after. While the present disclosure is not necessarily limited to such applications, various aspects of the disclosure may be appreciated through a discussion of various examples using this context.

One useful aspect of artificial intelligence (AI) systems is incorporating unstructured text into a knowledge corpus of structured texts that are subsequently mined for answers and information by the AI system. For example, these unstructured texts may include academic studies, medical patient results, business results, or any other kind of data that may be conveyed in (or converted into) textual format. The unstructured text may be received by an AI system in many formats, including file formats that are configured to retain some metadata on the characters such as a .doc, .docx, .txt, .htm, .rtf, or the like. In other examples, the unstructured text may be received by an AI system in a primarily graphical file format such as .pdf, .jpg, .png, or the like.

Once received, an initial step of a system to incorporate the unstructured text into the knowledge corpus is to perform a coreference analysis. Coreference is a linguistic concept where two or more different words or terms refer to the same thing or concept. For example, in the sentence, "the son said to his father, 'Dad, you should come see this,'" each of the words "father," "dad," and "you" refer to the same concept/person. The coreference analysis is performed over the entire document to link all terms that relate to the same concept together. If a coreference analysis does not extend from a beginning of the unstructured text until the end of the unstructured text, the AI system may miss some concepts that are linked, therein reducing and/or eliminating some utility that the AI system may gather from the unstructured text.

A conventional system may be able to perform a coreference analysis for small or medium sized unstructured texts on a single processing node quickly and efficiently. For example, a conventional system may be able to perform a coreference analysis for a document that is around 1 megabyte (mb) without much slowdown. However, if an unstructured text is relatively large (e.g., 5 mb, 10 mb, or larger) conventional systems may crash and/or experience significant slowdowns trying to perform a coreference analysis over the entire unstructured text using a single processing node, where a processing node is a single computing structure that is configured to execute workloads in parallel. As such, as used herein, processing nodes may be larger or smaller in different examples, such that for individuals working independently a processing node may be a central processing unit (CPU), for small organizations a processing node may include a processing core in which multiple CPUs work together, and for larger organizations a single processing node may include an entire server. For example, if a conventional system of a larger organization receives an unstructured text that is 2 gigabytes (GB), it may be difficult or impossible for a conventional system to perform a coreference analysis on this unstructured text within a reasonable time frame using a limited number of processing nodes (e.g., only one), even when these limited number includes a full server. As such, in order to perform a coreference analysis, conventional systems may devote a relatively large number of processing nodes to the analysis, turning this coreference analysis into a highly resource-intensive operation. In scenarios where a useful amount of resources is not available, this may mean that a conventional AI system may be functionally unable to utilize this large document in a meaningful way until such processing resources may be brought online and reserved for this task.

Some conventional systems look to address this problem by partitioning the unstructured text across a predetermined number of detected paragraphs of the unstructured text. However, many sources of unstructured text may not include paragraphs. For example, many articles as written on and/or downloaded from the Internet may not contain individual paragraph breaks. In such examples, the conventional systems may download a 10 mb article of unstructured text without paragraph breaks, leaving these conventional systems unable to perform a coreference analysis on the unstructured text in a reasonable time frame on relatively few processing nodes.

Some conventional systems may look to address this problem by partitioning the unstructured text into evenly sized sections that a single processing node may analyze. However, such a technique may fail to account for some sections being more sparsely populated by terms that relate to relevant concepts of the unstructured text, such that a standard "average" partitioning section may fail to gather terms with sufficient density in each section to perform an effective coreference analysis. For example, if two relevant terms are not used enough times within a given section (as that section relates to a tangential subject), a coreference analysis executed according to such a conventional method may fail to accurately identify that these two relevant terms relate to a relevant concept. As a result of failing to accurately identify this, some relationships and concepts that this document contain may be missed and/or misunderstood when these even sections are merged back together.

Accordingly, aspects of this disclosure may solve or otherwise address these technical problems of conventional coreference analysis systems. For example, aspects of this disclosure are related to partitioning document text into manageable sections of unstructured text using identified entities of the unstructured text, such that these sections may be individually run through separate coreference analyses. Once individually analyzed, these sections may be merged together into a full text. Aspects of this disclosure relate to a method that may quickly execute such a coreference analysis on a relatively large unstructured text on single processing nodes while still maintaining a relatively higher accuracy in comparison to conventional methods that partition unstructured texts. Further, in comparison to coreference analysis performed using a supercomputer (e.g., a computer with exceptional processing power that can perform coreference analysis on documents that are many gigabytes large and is also extremely expensive) aspects of this disclosure may enable this coreference analysis to be executed even faster in comparison. A computing device that includes a processing unit executing instructions stored on a memory may provide this functionality, this computing device herein referred to as a controller.

This controller may be configured to execute a named-entity recognition analysis on the unstructured text. The named-entity recognition (NER) analysis may be a "fast" analysis, such that an accuracy of the NER analysis is not prioritized. The controller may run the NER analysis such that a specific location of each entity within the unstructured text is identified. Where a topic of the unstructured text is known, the controller may identify terms from the NER analysis that relate to this topic. In other examples, the controller may run a rough natural language processing (NLP) analysis to identify a topic of the unstructured text (e.g., by identifying those entities that are most common among the NER analysis). In some examples, the controller may proceed without identifying a topic of the unstructured text.

The controller may use the results from the NER analysis to identify an entity to use as a partitioning point, such that this entity is an anchor entity. For example, the controller may identify an entity as an anchor entity in response to identifying that this entity is present within the unstructured text at least a threshold number of times, is associated with a topic of the unstructured text (e.g., where a topic is known), matches a predetermined list of possible anchor entities (e.g., where a user has and provides a preference), or the like. The controller may use this anchor entity at selected instances to partition the unstructured text. The controller may select instances of the anchor entity at which the controller may partition the unstructured text into sections that are each small enough to have a single processing node perform the coreference analysis for each section, while big enough to include sufficient data such that the coreference analysis can identify relationships between terms.

For example, the controller may identify instances of the anchor entity that are separated by a threshold number of words (e.g., no more than fifty words) and/or from a start or end of the unstructured text (e.g., such that the section may be partitioned by an anchor entity that is referenced at least once every fifty words). In some examples, the controller may identify that between each of the identified instances that at least a threshold number of the anchor entities are present (e.g., at least five of the anchor entities within each section). Additionally, the controller may identify natural language demarcation points associated with each of these instances.

For example, when evaluating various portions of the unstructured document as potential demarcation points, a controller may determine to classify an end of a paragraph that includes the relevant instance as the demarcation point (e.g., such that a partitioned section of the unstructured document concludes with the end of whichever paragraph includes the instance of the anchor entity). For another example, where the instance is in the middle of a relatively large paragraph (e.g., a paragraph that includes 2 mb of data) that includes another instance (e.g., where a first anchor entity instance is half-way through the large paragraph and a second anchor entity instance is at the very end of the large paragraph), the natural language demarcation point may be the end of the sentence that includes the instance to avoid the section being larger than a threshold size. By configuring the controller to identify beginning and ending points of sections using natural language demarcation points while accounting for how these demarcation points impact a size of the sections, the controller may increase both: a likelihood that each section will have more relevant entities within that section to help the individual coreference analyses (e.g., as writers tend to include relevant references within singular sentences and paragraphs); and a likelihood that each section is small enough that it can be processed quickly (e.g., processed within a threshold amount of time).

Figure 1:
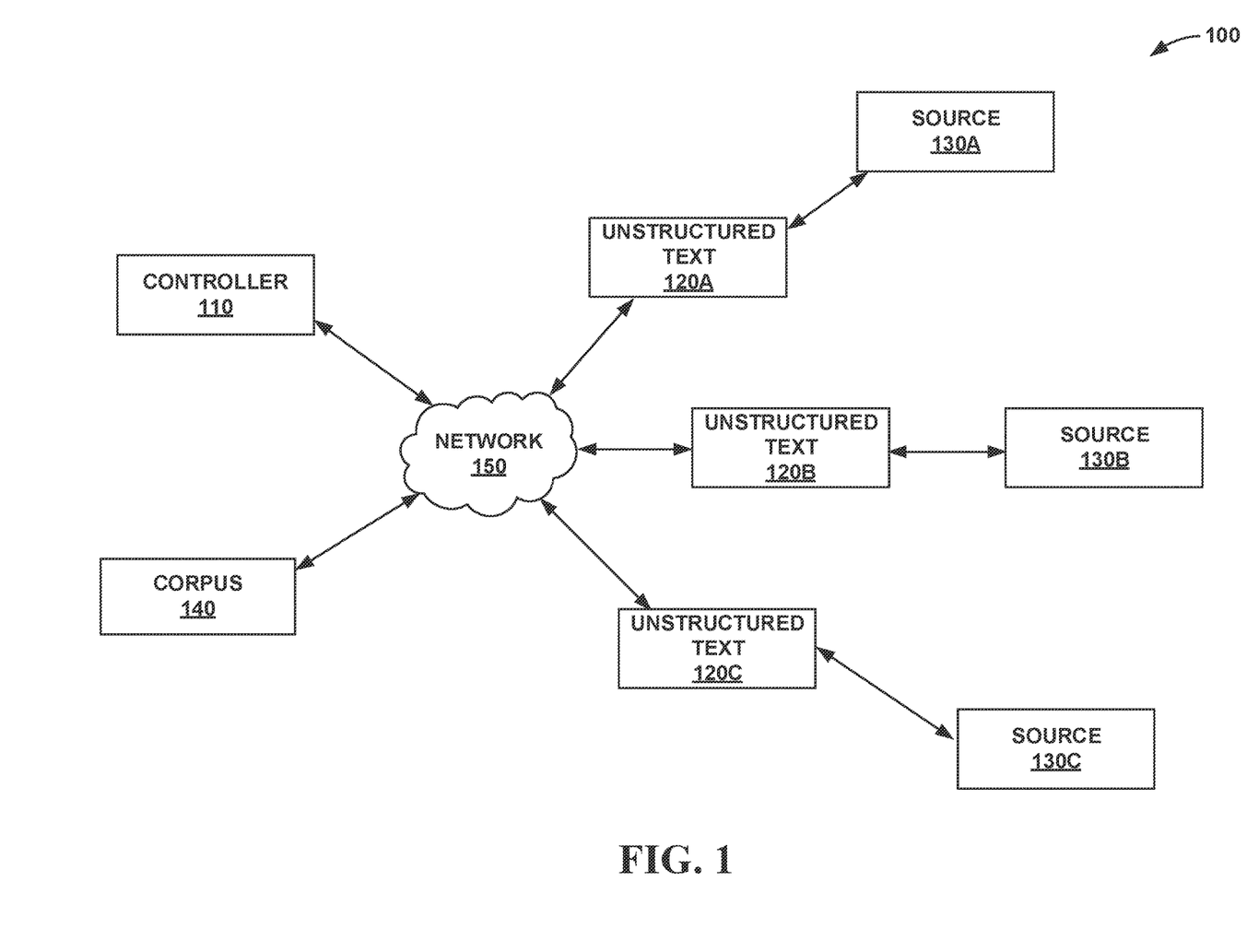
FIG. 1 depicts a conceptual diagram of an example system in which a controller may prepare unstructured texts for coreference analysis.

For example, FIG. 1 depicts environment 100 in which controller 110 manages preparing a plurality of unstructured texts 120A-120C (collectively, "unstructured texts 120") for coreference analysis. As depicted, unstructured texts 120 may originate from one or more sources 130A-130C (collectively, "sources 130"). Sources 130 may include online repositories, individual computing devices (e.g., desktop computer or laptop computers), scanning devices (e.g., copier machines), or the like. In some examples, controller 110 may actively gather unstructured texts 120 from sources 130. Additionally, or alternatively, controller 110 may receive unstructured texts 120 as sent by sources 130 to controller 110. Though single unstructured texts 120 are depicted as coming from each of sources 130 in FIG. 1 for purposes of illustration, in other examples, some sources 130 may be a source of many and/or all unstructured texts 120.

Figure 2:
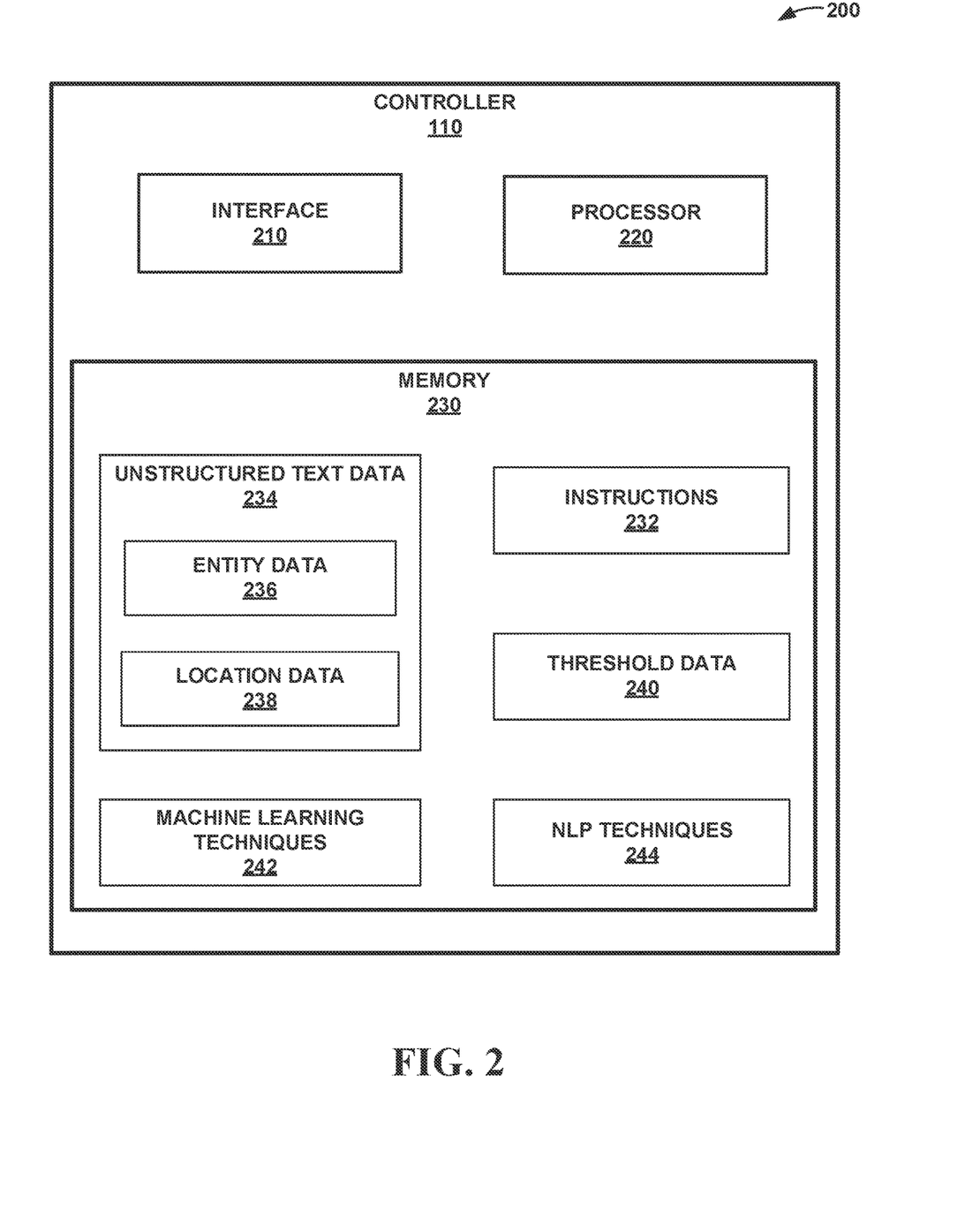
FIG. 2 depicts a conceptual box diagram of example components of the controller of FIG. 1.

Controller 110 may include a computing device, such as computing system 200 of FIG. 2 that includes a processor communicatively coupled to a memory that includes instructions that, when executed by the processor, causes controller 110 to execute one or more operations described below. In some examples, controller 110 may be incorporated into (or be functionality of) an AI system that is processing unstructured texts 120 as described above. For example, controller 110 may include (or be part of) functionality that manages corpus 140 of text to answer queries from users. Corpus 140 may include structured text. Structured text, as defined herein, may include text for which syntactical, linguistic, and/or thematic relationships are known for and between some or all words of the text. Some or all of the structured text of corpus 140 may previously have been unstructured texts 120, and as described herein, controller 110 may prepare unstructured texts 120 for a coreference analysis that incorporates unstructured texts 120 into the corpus 140. For example, the structured text can include metadata describing the individual words of an unstructured text 120. In some examples, this metadata may define the meaning of each word, both individually and within the context of the unstructured text 120. Though controller 110 is depicted as separate from corpus 140 in FIG. 1 for purposes of illustration, in some examples controller 110 and corpus 140 may be part of a single AI computing system.

Controller 110 may receive unstructured texts 120 over network 150. Network 150 may include one or more computer communication networks. An example network 150 can include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, sources 130, and/or corpus 140) may receive messages (e.g., such as messages that include unstructured texts 120) and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may manage connectivity as described herein.

As described above, controller 110 may partition unstructured texts 120 into smaller sections, such that single respective different processing nodes may perform coreference analyses on each of these sections (e.g., perform them in parallel). Controller 110 may be configured to partition unstructured texts 120 using identified entities. By using entities rather than paragraphs, evenly spaced sections, or the like, controller 110 may improve a likelihood that each section will relate to a relevant topic (and therein result in a more accurate full coreference analysis). Further, partitioning unstructured texts 120 into sections may make it possible to perform a coreference analysis relatively faster than would otherwise be possible (while still maintaining a relatively high accuracy, e.g., 80% accuracy). Thus, controller 110 may identify entities that occur a threshold amount of time as being potential anchor entities, and/or identify entities that related to an identified topic as potential anchor entities, or the like. Additionally, controller 110 may partition the unstructured texts 120 based on the potential anchor entities.

As described herein, controller 110 may run a conventional NER analysis to identify entities of unstructured texts 120. Controller 110 may run a "standard" NER analysis or a fast NER analysis (e.g., a NER analysis that sacrifices accuracy for speed and lower processing requirements). In some examples, it may be unnecessary to use a high-accuracy NER analysis, as aspects of this disclosure relate to providing quicker and less processing-intensive techniques at the expense of high accuracy.

The NER analysis as run by controller 110 may identify a location of each entity within unstructured texts 120. For example, controller 110 may identify a character range of each entity (e.g., denoting the first and last character position within respective unstructured texts 120 at which respective entities begin and end). Where unstructured texts 120 include sentences and paragraphs, controller 110 may identify the sentence and paragraph that include the entity. For example, controller 110 may store each identified entity result from the NER analysis in a format similar to: <entity_name>: [Instance$_1$, Instance$_2$ . . . Instance$_N$], part_of_paragraph: [PoP$_1$, PoP$_2$ . . . POP$_N$], sentence_number: [SN$_1$, SN$_2$ SN$_N$], paragraph_number: [PN1, PN2 . . . PN$_N$].

Once controller 110 identifies entities (and locations thereof), controller 110 may identify entities that may be used as anchors or anchor entities, where unstructured texts 120 are partitioned into sections that are separated by anchor entities. In some examples, controller 110 may utilize a brute force approach, and therein identify entities that are at least a threshold distance from the relatively nearest identified anchor entity (or a threshold distance from the start of respective unstructured texts 120) as the next anchor entity. For example, in some situations, controller 110 may determine that processing power is costly, and the speed with which the coreference analysis is performed may be prioritized over the accuracy of the coreference analysis. In such situations, controller 110 may start at a beginning of unstructured texts 120 and identify any entity which is a threshold distance (e.g., around 1 mb of text data, a threshold amount of words, a threshold amount of anchor entities) away from the beginning as the first anchor entity, such that a section that is marked by this first identified anchor entity will include at least a threshold amount of text. Once this first anchor entity is identified, controller 110 may identify a natural language demarcation point associated with this first anchor entity. This natural language demarcation point may include a character position in unstructured text 120 at which the phrase, sentence, paragraph, thought, or the like that includes the first anchor entity ends. Controller 110 may use NLP techniques as described herein to identify a natural language demarcation point associated with each anchor entity. Once controller 110 identifies this first anchor entity using this brute force approach, controller 110 may look for a second anchor entity in much the same way, except working from the first anchor entity rather than from the beginning of respective unstructured texts 120, etc.

In other examples, controller 110 may be relatively more selective in identifying entities to use as anchor entities. Where controller 110 has access to (or otherwise determines) a topic of unstructured texts 120 and/or potential anchor entities (e.g., where a user knows that one unstructured text 120A relates to United States Government, such that a good anchor entity will be the word "President"), controller 110 may use these anchor entities (and/or use anchor entities that relate to this topic). For example, once controller 110 determines that the word, "President," is an anchor entity, controller 110 may identify instances of this anchor entity. Alternatively, controller 110 may look to identify instances of a plurality of anchor entities. For example, controller 110 may be configured to identify (and therein use as partitioning points) instances of either the anchor entity, "President," or the anchor entity, "Congress."

In other examples, where controller 110 does not know a topic of unstructured texts 120, controller 110 may identify entities as usable anchor entities when these anchor entities are present at least a threshold amount of times within unstructured texts 120. For some examples this threshold amount of times may be a predetermined number (e.g., at least 200 times within unstructured texts 120), whereas in other times whichever entities are, e.g., one of the two or three most populous entities within unstructured texts 120 may be identified as satisfying the threshold amount.

By configuring controller 110 to identify anchor entities (that will then be used as partitioning points) that are associated with the topic and/or are present a threshold amount of times, controller 110 may increase a likelihood that each eventual partitioned section relates to a relevant topic of unstructured texts 120. By increasing a likelihood that each section relates to a relevant topic of unstructured texts 120, controller may increase a likelihood that a final merged coreference analysis will accurately connect entities to concepts throughout unstructured texts 120.

Much like with the brute-force approach method described above, once potential anchor entities are identified, controller 110 may identify each specific instance of identified anchor entities based on desired characteristics of the sections that will be defined by the specific instances. As described above, controller 110 may use a threshold minimum section size and/or a threshold maximum section size as inputs in identifying instances of anchor entities that will be used as partitioning points. This input may be saved in a format such as <DESIRED_TEXT_SIZE> which may include an upper and lower limit. This input may be managed by authorized users, and/or managed and updated by controller 110 using machine learning tweaks to customize section sizes to achieve efficiencies in speed and accuracy.

As mentioned above, controller 110 may define the section size and/or type of text such that a subsequent coreference analysis on this section will correlate sufficiently to the full unstructured text 120. For example, controller 110 may verify that a density of a word surpasses a threshold, such that a section mentions the anchor entity once per some threshold amount of words (e.g., how many mentions back to look when considering possible antecedents of the current mention). This mention input may be saved as core.maxMentionDistance, where a maximum amount may be a distance (as measured by words) of no more than 50. Similarly, controller 110 may ensure that each section is identified by an instance of an anchor entity that has at least a threshold amount of anchor entities within that section. This threshold may be saved as coref.maxMentionDistance-WithStringMatch, where an example amount may be five (e.g., such that each section includes at least five of each and/or the identified anchor entity). If controller 110 identifies possible adjacent sections that are too small, controller 110 may combine identified possible adjacent sections until the conjoined sections are at least as big as the <DESIRED_TEXT_SIZE>.

Once all sections are partitioned, controller 110 may cause each section to have a respective coreference analysis executed on these sections. These coreference analyses may be performed in parallel according to any method consistent with this disclosure (rules based, statistical, neural-net based, etc.). Controller 110 may cause these coreference analyses to be processed on the same machine on multiple central processing unit (CPU) cores, on a cluster of nodes, or on any other type of system that is consistent with this disclosure. Once all of the coreference analyses are completed, controller 110 may merge this core-resolved text into a single document. In other examples, controller 110 may cause these separate sections to run through NLP pipeline in partitioned structure for use within corpus 140.

As described above, controller 110 may be part of a computing device that includes a processor configured to execute instructions stored on a memory to execute the techniques described herein. For example, FIG. 2 is a conceptual box diagram of such computing system 200 of controller 110. While controller 110 is depicted as a single entity (e.g., within a single housing) for the purposes of illustration, in other examples, controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) to communicate with entities external to controller 110. Specifically, interface 210 may be configured to enable components of controller 110 to communicate with sources 130, corpus 140, or the like. Interface 210 may include one or more network interface cards, such as Ethernet cards and/or any other types of interface devices that can send and receive information. Various numbers of interfaces may be used to perform the described functions according to particular needs.

As discussed herein, controller 110 may be configured to prepare unstructured texts 120 that are larger than a threshold size for coreference analysis. Controller 110 may utilize processor 220 to thusly prepare unstructured texts. Processor 220 may include, for example, microprocessors, digital signal processors (DSPs), application specific integrated circuits (ASICs), field-programmable gate arrays (FPGAs), and/or equivalent discrete or integrated logic circuits. Two or more of processor 220 may be configured to work together to prepare unstructured texts 120 for coreference analysis accordingly.

Processor 220 may partition unstructured texts 120 for coreference analysis according to instructions 232 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may partition unstructured texts 120 for coreference analysis in response to determining that these unstructured texts 120 are relatively large as described herein according to instructions 232 of one or more applications (e.g., software applications) stored in memory 230 of controller 110.

In addition to instructions 232, in some examples gathered or predetermined data or techniques or the like as used by processor 220 to prepare unstructured texts 120 for coreference analysis as described herein may be stored within memory 230. For example, memory 230 may include information described above as controller 110 gathers from unstructured text 120. For example, as depicted in FIG. 2, memory 230 may include unstructured text data 234, which includes entity data 236 and location data 238. Unstructured text data 234 may include the full set of unstructured text 120, in whatever file format controller 110 received unstructured text 120. Entity data 236 may include the full set of entities as identified by the NER analysis conducted by controller 110. Unstructured text data 234 may also include location data 238, which may include a location of each entity identified by the NER analysis. For example, location data 238 may include an identifier of which sentence and/or paragraph within the relevant unstructured text 120 each entity is, and/or which word within a sentence the entity is. For example, location data 238 may specify that an entity is found at the $5^{th}$ word of the $3^{rd}$ sentence of the $30^{th}$ paragraph. In some examples, location data 238 may define the characters that are associated with the entities (e.g., storing that an entity "president" is associated with characters 502-510 of unstructured text 120A).

Further, memory 230 may include threshold data 240. Threshold data 240 may include a threshold at which controller 110 is to partition unstructured texts 120 for coreference analysis as described herein. Threshold data 240 may also include a threshold lower limit as to how small sections may be (e.g., as specified by a minimum number of entities that have to be within each section), and/or how large sections may be (e.g., as specified by a data size that may be contained within each section). In some examples, threshold data 240 may include a threshold number of one or more anchor entities that must be within each section, and/or a minimum density of anchor entities as described above. In some examples, some or all thresholds within threshold data 240 may be customizable, and/or unique to some users, organizations, computer systems, or the like. For example, an organization may set a first threshold size of 1 mb (at which unstructured texts 120 are partitioned by controller 110 as described herein) for a first computer system that has relatively low processing power, and set a second threshold size of 10 mb for a second computer system that has relatively high processing power.

Memory 230 may further include machine learning techniques 242 that controller 110 may use to improve a process of preparing unstructured texts 120 as discussed herein over time. Machine learning techniques 242 can comprise algorithms or models that are generated by performing supervised, unsupervised, or semi-supervised training on a dataset, and subsequently applying the generated algorithm or model to prep unstructured texts 120 for coreference analysis. For example, using machine learning techniques 242, controller 110 may update one or more thresholds saved in threshold data 240 to improve a process of preparing unstructured texts 120 for coreference analysis.

Machine learning techniques 242 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 242 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Memory 230 may further include NLP techniques 244. NLP techniques 244 can include, but are not limited to, semantic similarity, syntactic analysis, and ontological matching. For example, in some embodiments, processor 220 may be configured to analyze unstructured text data 234 and/or entity data 236 as gathered from unstructured texts 120 to determine semantic features (e.g., word meanings, repeated words, keywords, etc.) and/or syntactic features (e.g., word structure, location of semantic features in headings, title, etc.) of unstructured texts 120. Ontological matching could be used to map semantic and/or syntactic features to a particular concept. The concept can then be used to determine the topic of unstructured texts 120. In this same way, controller 110 may identify that a topic of one or more unstructured texts 120 in order to identify respective anchor entities as described herein.

Figure 3:
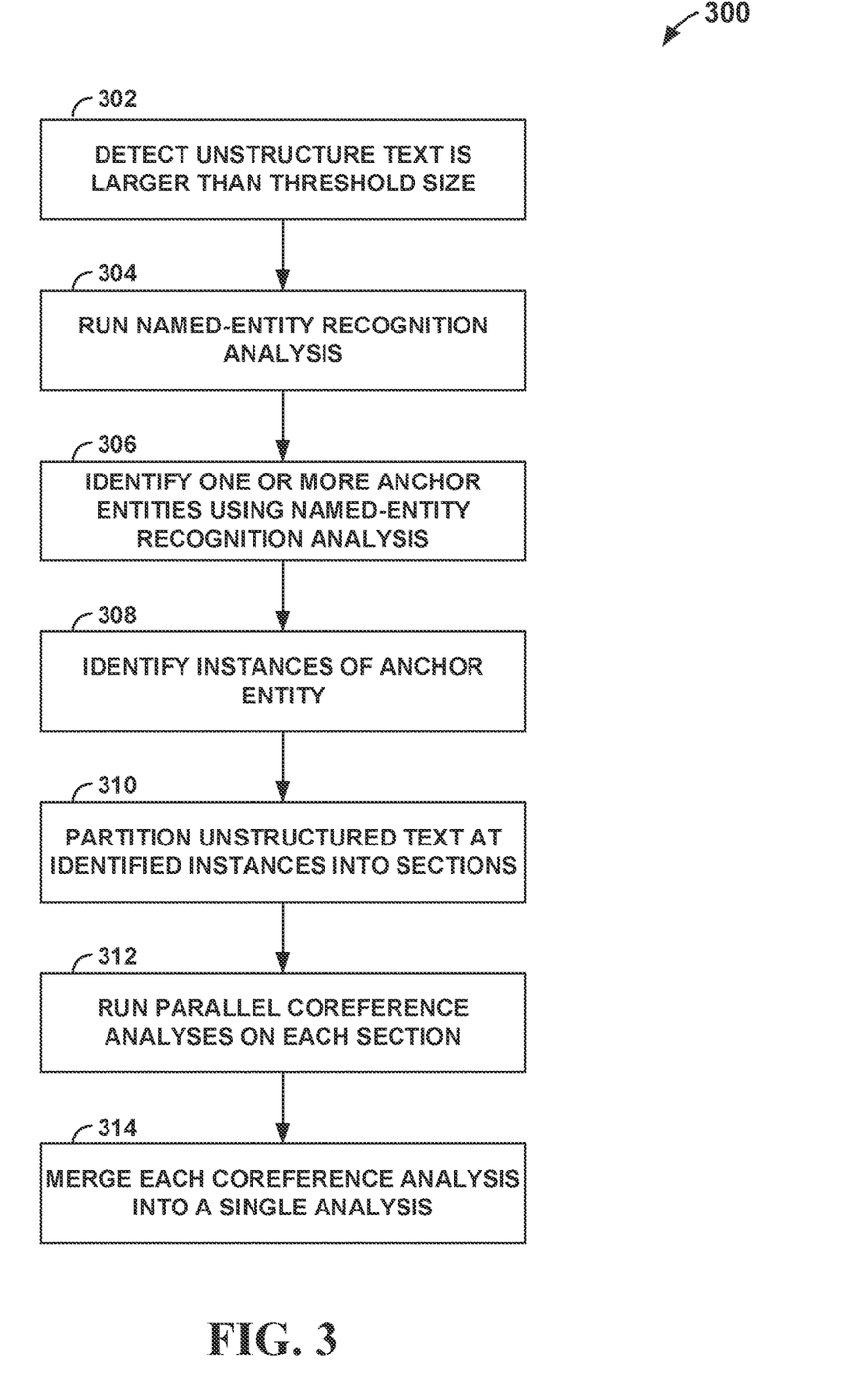
FIG. 3 depicts an example flowchart by which the controller of FIG. 1 may prepare unstructured texts for coreference analysis.

Using these components, controller 110 may prepare relatively large unstructured texts for coreference analysis as discussed herein. For example, controller 110 may prepare unstructured texts for coreference analysis according to flowchart 300 depicted in FIG. 3. Flowchart 300 of FIG. 3 is discussed with relation to FIG. 1 for purposes of illustration, though it is to be understood that other systems and message may be used to execute flowchart 300 of FIG. 3 in other examples. Further, in some examples controller 110 may execute a different method than flowchart 300 of FIG. 3, or controller 110 may execute a similar method with more or less steps in a different order, or the like.

Flowchart 300 starts with controller 110 detecting unstructured text 120A that is larger than a threshold size (302). This threshold size may be a size at which it is difficult or impossible for a processing node to execute coreference analysis for unstructured text 120A, and/or difficult or impossible for this processing node to execute this coreference analysis within a threshold time period, or the like. For example, the threshold size may be 1 mb, 5 mb, 10 mb, or another size. In some examples, controller 110 may be aware of different threshold sizes for different processing nodes (e.g., where a first more powerful processing node has a larger threshold size than a second less powerful processing node).

Controller 110 runs NER analysis on this unstructured text 120A (304). In some examples, controller 110 may run a relatively "rough" or unrefined NER analysis that prioritizes speed and a prioritization of reduced processing utilization over accuracy. For example, controller 110 may run a NER analysis that does not correctly identify a type of each entity, misses a small number of entities, or the like. Controller 110 may run the NER analysis such that a position of each entity within unstructured text 120A is identified and saved. For example, controller 110 may identify and save a specific sentence that each entity is in, a specific place within that sentence, a specific paragraph, or the like. In some examples, controller 110 may identify a number of words, characters, and/or data (e.g., as analyzed in bytes) are included between each entity.

Controller 110 identifies one or more anchor entities using results from NER analysis (306). For example, controller 110 may identify nouns or subjects that appear more than a threshold amount of times. By identifying anchor entities that appear more than a threshold amount of times (e.g., at least twice, or at least ten times, or one hundred times), controller 110 may therein identify sections that each relate to a larger subject, such that a subsequent coreference analysis is more likely to merge with accurate results. Conversely, as described above, conventional systems that partition unstructured text 120A randomly (e.g., without looking at entities) may cause some sections to not reflect the tone or topic of the respective unstructured text 120A, such that coreference results gathered by these conventional systems may be relatively less accurate (or, if the coreference analysis is executed without partitioning, the results may take a relatively longer amount of time to be gathered).

Where controller 110 has received or identified a topic of unstructured texts 120, controller 110 may identify that each identified anchor entity relates to this topic. For example, if controller 110 identifies a topic to be "United States Government," controller 110 may further identify a first anchor entity of "president", such that controller 110 considers each instance of this anchor entity of "president" as potential partitioning points. In some examples, only one entity is used for all partitioning points, such that all sections are divided by instances of this anchor entity. In other examples, numerous entities are considered for anchor entities that are to be used as partitioning points. For example, if the topic is "United States Government," two anchor entities may be "president" and "congress."

Controller 110 identifies instances of these identified anchor entities to serve as partitioning points (308). Controller 110 identifies instances such that each individual section has enough text so that a coreference analysis will return useful data, but not too much text such that a processing node assigned to perform this coreference analysis will be slowed down. For example, controller 110 may identify instances so that each instance has at least a threshold amount of text between itself and the next nearest instance (or the nearest beginning or end of respective unstructured texts 120, as is applicable). To continue the United States Government example, controller 110 may identify instances that correlate to sections that include at least 500 kb of text and less than 2 mb of text. In some examples, controller 110 may identify processing nodes that will analyze each section (in parallel with other sections as by other processing nodes), and may identify respective threshold sizes that are different for different processing nodes.

Controller 110 partitions unstructured text 120 into sections at these instances of identified entities (310). Controller 110 may partition unstructured texts 120 at natural language demarcation points associated with each instance. For example, controller 110 may partition unstructured texts 120 to end with the sentence that includes the instance, such that the period at the end of the sentence that includes the instance is the natural language demarcation point. For another example, controller 110 may identify the paragraph that includes the instance as the natural language demarcation point. Controller 110 may use paragraphs as natural language demarcation points where paragraph lengths are less than a threshold size (e.g., less than 1000 words).

Controller 110 causes separate processing nodes to perform coreference analyses for each partitioned section of respective unstructured texts 120 (312). In some examples, controller 110 may cause coreference analyses to perform in parallel for each partitioned section. Where performed in parallel, controller 110 may cause each section to have a coreference analysis performed on a separate single processing node. Once all coreference analyses are performed, controller 110 merges the separate coreference analyses into a single master coreference analysis for the full unstructured text 120 (314). This single master coreference analysis may link relatively numerous mentions of a single concept within the full unstructured text 120.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
running named-entity recognition analysis on an unstructured text in response to determining that the unstructured text is larger than a threshold size;
identifying one or more anchor entities of the unstructured text that each occur more than a threshold total amount of times within the unstructured text;
identifying two or more instances of the one or more anchor entities that are separated by at least a threshold amount of text of the unstructured text;
partitioning the unstructured text at respective natural language demarcation points associated with each of the two or more instances into at least three sections such that each of the at least three sections is smaller than the threshold size; and performing separate coreference analyses in parallel on each of the at least three sections.

2. The computer-implemented method of claim 1, further comprising merging the separate coreferences analyses into a single coreference analysis for the full unstructured text document.

3. The computer-implemented method of claim 1, wherein the threshold size is at least five megabytes in size.

4. The computer-implemented method of claim 1, wherein the unstructured text does not include paragraph breaks.

5. The computer-implemented method of claim 1, wherein identifying the two or more instances includes identifying that each of the three or more sections indicated by the two or more instances includes at least a threshold number of each of the one or more anchor entities.

6. The computer-implemented method of claim 1, wherein the natural language demarcation points include a conclusion of a sentence that includes one of the instances.

7. The computer-implemented method of claim 1, wherein the natural language demarcation points include a conclusion of a paragraph that includes one of the instances.

8. The computer-implemented method of claim 1, further comprising using natural language processing (NLP) techniques to identify a topic of the unstructured text, wherein identifying the one or more anchor entities includes verifying that each of the anchor entities relates to the topic.

9. The computer-implemented method of claim 1, wherein each of the separate coreference analyses are performed on separate single processing nodes.

10. A system comprising:
a processor; and
a memory in communication with the processor, the memory containing instructions that, when executed by the processor, cause the processor to:
run named-entity recognition analysis on an unstructured text in response to determining that the unstructured text is larger than a threshold size;
identify one or more anchor entities of the unstructured text that each occur more than a threshold total amount of times within the unstructured text;
identify two or more instances of the one or more anchor entities that are separated by at least a threshold amount of text of the unstructured text;
partition the unstructured text at respective natural language demarcation points associated with each of the two or more instances into at least three sections such that each of the at least three sections is smaller than the threshold size; and
performed separate coreference analyses in parallel on each of the at least three sections.

11. The system of claim 10, the memory containing additional instructions that, when executed by the processor, cause the processor to merge the separate coreferences analyses into a single coreference analysis for the full unstructured text document.

12. The system of claim 10, wherein the unstructured text does not include paragraph breaks.

13. The system of claim 10, wherein identifying the two or more instances includes identifying that each of the at least three sections indicated by the two or more instances includes at least a threshold number of the one or more anchor entities.

14. The system of claim 10, wherein the natural language demarcation points include a conclusion of a sentence that includes one of the instances.

15. The system of claim 10, wherein the natural language demarcation points include a conclusion of a paragraph that includes one of the instances.

16. The system of claim 10, the memory containing additional instructions that, when executed by the processor, cause the processor to use natural language processing (NLP) techniques to identify a topic of the unstructured text, wherein identifying the one or more anchor entities includes verifying that each of the one or more anchor entities relates to the topic.

17. A computer program product, the computer program product comprising a computer readable storage medium having program instructions embodied therewith, the program instructions executable by a computer to cause the computer to:
run named-entity recognition analysis on an unstructured text in response to determining that the unstructured text is larger than a threshold size;
identify one or more anchor entities of the unstructured text that each occur more than a threshold total amount of times within the unstructured text;
identify two or more instances of the one or more anchor entities that are separated by at least a threshold amount of text of the unstructured text;
partition the unstructured text at respective natural language demarcation points associated with each of the two or more instances into at least three sections such that each of the at least three sections is smaller than the threshold size; and
performed separate coreference analyses in parallel on each of the at least three sections.

18. The computer program product of claim 17, the computer readable storage medium containing additional instructions that, when executed by the computer, cause the computer to:
use natural language processing (NLP) techniques to identify a topic of the unstructured text, wherein identifying the one or more anchor entities includes verifying that each of the one or more anchor entities relates to the topic; and
merge the separate coreferences analyses into a single coreference analysis for the full unstructured text document.

19. The computer program product of claim 17, wherein identifying the two or more instances includes identifying that each of the at least three sections indicated by the two or more instances includes at least a threshold number of each of the one or more anchor entities.

20. The computer program product of claim 17, wherein the natural language demarcation points include both a conclusion of a sentence that includes a first one of the instances and a conclusion of a paragraph that includes a second one of the instances.

* * * * *